United States Patent
Hsu et al.

(10) Patent No.: US 10,133,378 B2
(45) Date of Patent: Nov. 20, 2018

(54) TOUCH DEVICE

(71) Applicant: TPK Touch Solutions (Xiamen) Inc., Xiamen (CN)

(72) Inventors: I-Chung Hsu, Taipei (TW); Kuo-Shu Hsu, Xinbei (TW); Chunyong Zhang, Xiamen (CN); Fenghua Lu, Xiamen (CN); Chenghong Xu, Shangrao (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 27 days.

(21) Appl. No.: 14/806,665

(22) Filed: Jul. 23, 2015

(65) Prior Publication Data

US 2016/0026314 A1 Jan. 28, 2016

(30) Foreign Application Priority Data

Jul. 24, 2014 (CN) .......................... 2014 1 0355738

(51) Int. Cl.
*G06F 3/041* (2006.01)
*G06F 1/16* (2006.01)

(52) U.S. Cl.
CPC .......... *G06F 3/0412* (2013.01); *G06F 1/1626* (2013.01); *G06F 1/1643* (2013.01); *G06F 3/041* (2013.01); *G06F 2203/04103* (2013.01)

(58) Field of Classification Search
CPC ........................................ G06F 3/041–3/044
See application file for complete search history.

(56) References Cited

U.S. PATENT DOCUMENTS

| | | | | |
|---|---|---|---|---|
| 8,994,680 | B2 * | 3/2015 | Lai | G06F 3/041 178/18.01 |
| 9,304,616 | B2 * | 4/2016 | Lin | G06F 3/041 |
| 9,423,912 | B2 * | 8/2016 | Yin | G06F 3/041 |
| 2011/0128252 | A1 * | 6/2011 | Nah | G06F 3/044 345/174 |
| 2011/0141034 | A1 * | 6/2011 | Lai | G06F 3/041 345/173 |
| 2012/0075209 | A1 * | 3/2012 | Lee | G06F 3/044 345/173 |
| 2013/0076649 | A1 * | 3/2013 | Myers | H04M 1/0268 345/173 |
| 2013/0093697 | A1 * | 4/2013 | Sun | G06F 3/044 345/173 |
| 2013/0106739 | A1 * | 5/2013 | Lee | G06F 3/044 345/173 |
| 2013/0106746 | A1 * | 5/2013 | Lai | G06F 3/041 345/173 |
| 2013/0169597 | A1 * | 7/2013 | Yin | G06F 3/041 345/175 |
| 2013/0265253 | A1 * | 10/2013 | Lin | G06F 3/041 345/173 |

(Continued)

Primary Examiner — Patrick F Marinelli
(74) Attorney, Agent, or Firm — Cooper Legal Group, LLC

(57) ABSTRACT

A touch device includes a transparent substrate, at least one reflection increasing structure, and a masking layer. The transparent substrate has an non-visible area and a visible area. The non-visible area is located around the periphery of the visible area. The reflection increasing structure is disposed on the non-visible area of the transparent substrate. The masking layer corresponds to the reflection increasing structure and it is disposed on the non-visible area of the transparent substrate.

20 Claims, 4 Drawing Sheets

(56) References Cited

U.S. PATENT DOCUMENTS

| | | | | |
|---|---|---|---|---|
| 2013/0314347 A1* | 11/2013 | Muraoka | H01H 9/02 | 345/173 |
| 2013/0335345 A1* | 12/2013 | Liu | G06F 3/041 | 345/173 |
| 2014/0313440 A1* | 10/2014 | Hsu | G06F 3/044 | 349/12 |
| 2014/0340594 A1* | 11/2014 | Chang | G06F 3/041 | 349/12 |
| 2014/0363649 A1* | 12/2014 | Kim | H01B 1/08 | 428/216 |
| 2014/0368757 A1* | 12/2014 | Chen | H03K 17/9622 | 349/12 |
| 2015/0029414 A1* | 1/2015 | Hur | G06F 3/041 | 349/12 |
| 2015/0049051 A1* | 2/2015 | Stone | G06F 3/044 | 345/174 |
| 2015/0070794 A1* | 3/2015 | Wu | G02B 5/0816 | 359/838 |
| 2015/0220191 A1* | 8/2015 | Huh | G06F 3/044 | 345/173 |
| 2015/0277630 A1* | 10/2015 | Kao | G06F 3/0412 | 345/174 |
| 2015/0301652 A1* | 10/2015 | Yang | G06F 3/041 | 345/174 |
| 2015/0370357 A1* | 12/2015 | Hsu | G06F 3/044 | 345/173 |
| 2016/0004350 A1* | 1/2016 | Zilbauer | G02B 1/115 | 428/212 |
| 2016/0026314 A1* | 1/2016 | Hsu | G06F 1/1626 | 345/173 |
| 2016/0124546 A1* | 5/2016 | Chen | G06F 3/044 | 345/174 |
| 2016/0152002 A1* | 6/2016 | Inui | B32B 7/02 | 428/172 |
| 2016/0221315 A1* | 8/2016 | Saiki | B32B 27/16 | |

* cited by examiner

TOUCH DEVICE

This Non-provisional application claims priority to Chinese Patent Application No. 201410355738.X filed in the People's Republic of China on Jul. 24, 2014, the entire contents of which are hereby incorporated by reference.

BACKGROUND OF THE INVENTION

Technical Field

The disclosure is related to touch devices.

Related Art of the Invention

With the advance of technology, a variety of information technology (IT) equipment has emerged, including mobile phones, tablets, ultrabooks, satellite navigation and so on. In addition to general utilization of a keyboard and mouse for input and control, utilizing touch technology to control the IT equipment is a convenient and popular control method. A touch display panel has a user-friendly and intuitive interface for input operation, such that users of any age can directly select or control the IT equipment by finger or stylus. Therefore, touch display panels have gained popularity in the market.

The touch display panel includes a visible area and a non-visible area outside the visible area. An ink layer is disposed on the non-visible area for hiding a plurality of electronic components within the touch display panel, such that the touch display panel has improved aesthetics. However, when the monitor of the touch display panel is turned off, because the visible area does not have the ink layer, the visible area has a color different from that of the non-visible area.

SUMMARY OF THE INVENTION

In view of foregoing subject, a touch device according to the disclosure increases the equivalent reflectivity of the non-visible area by reflection increasing structure disposed on the non-visible area of the transparent substrate, so that the apparent colors of the non-visible area and the visible area are the same when the monitor of the touch device is turned off.

For achieving above objective, a touch device according to the present disclosure includes a transparent substrate, at least one reflection increasing structure and a masking layer. The transparent has an non-visible area and a visible area. The non-visible area is located around the periphery of the visible area. The reflection increasing structure is disposed on the non-visible area of the transparent substrate. The masking layer corresponds to the reflection increasing structure and it is disposed on the non-visible area of the transparent area.

In one or more embodiments, the reflection increasing structure and the masking layer are disposed on the same side of the transparent substrate.

In one or more embodiments, the reflection increasing structure and the masking layer are disposed on different sides of the transparent substrate, respectively.

In one or more embodiments, the touch device further includes a planar layer disposed on the same side of the transparent substrate that the reflection increasing structure is disposed on, the planar layer is disposed on the visible area of the transparent substrate, and a surface of the planar layer away from the transparent substrate and a surface of the reflection increasing structure away from the transparent substrate are substantially co-planar.

In one or more embodiments, the material of the planar layer is the same as the material of the transparent substrate.

In one or more embodiments, the reflection increasing structure is a single film structure, and the refractive index of the reflection increasing structure is between 1.5 and 1.9.

In one or more embodiments, the reflection increasing structure is a complex structure, the reflection increasing structure has at least two reflection increasing film, and the refractive indexes of the two adjacent reflection increasing films are different.

In one or more embodiments, the reflection increasing structure has a first reflection increasing film and a second reflection increasing film, the first reflection increasing film is disposed on the transparent substrate, the second reflection increasing film covers the first reflection increasing film, wherein the refractive index of the first reflection increasing film is between 1.6 and 2.5, and the refractive index of the second reflection increasing film is between 1.3 and 1.5.

In one or more embodiments, the material of the reflection increasing structure has silicon oxide ($SiO_5$), magnesium fluoride ($MgF_2$), titanium oxide ($Ti_3O_5$), niobium oxide ($Nb_2O_5$), nitrogen silicide ($SiN_x$) nitrogen oxide silicon ($SiO_xN_y$) or a combination of those.

In one or more embodiments, the thickness of the reflection increasing structure is between 10 nm and 100 nm.

In one or more embodiments, the transparent substrate is a glass substrate, a plastic substrate, a sapphire substrate or a polarization film.

In one or more embodiments, the masking layer has an ink, a photoresist or a combination of those.

In one or more embodiments, a color tolerance for the visible area and the non-visible area is less than 4 SDCM.

In one or more embodiments, the touch device further includes a touch sensing structure disposed on the transparent substrate and at least disposed on the visible area.

In one or more embodiments, the touch device further includes a display module adhered to the transparent substrate via a adhesive layer.

In summary, the touch device of the disclosure utilizes the reflection increasing structure disposed on the non-visible area of the transparent substrate to increase the equivalent reflectivity of the non-visible area, such that the apparent colors of the non-visible area and the visible area are uniform when the monitor of the touch device is turned off.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE INVENTION

A touch device according to a preferred embodiment of the disclosure will be apparent from the following detailed description, which proceeds with reference to the accompanying drawings, wherein the same references relate to the same elements. The direction "upper side" and "lower side" is only relative to the location relationship. Further, a first device is formed "on the upper side" or "on the lower side", which represents that the first device directly contacts with the second device, or the first device indirectly contact with the second device, at which, an auxiliary component is disposed therebetween.

Figure 1A:
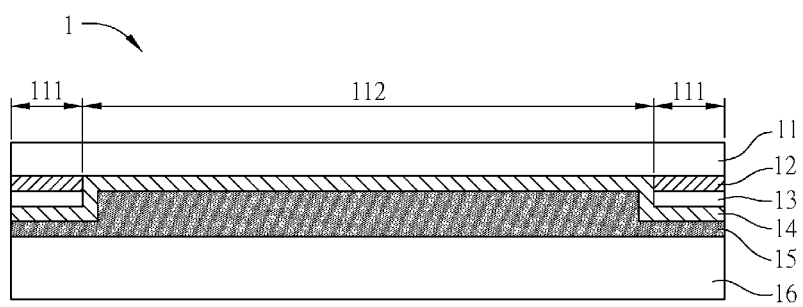
FIG. 1A is a cross-sectional view of a touch device according to a first embodiment of the disclosure.

FIG. 1A is a cross-sectional view of a touch device 1 according to at least one embodiment of the disclosure. Referring to FIG. 1A, a touch device 1 can be, for example, but is not limited to, a smart phone, a tablet or a wearable device. In some embodiments, the touch device 1 includes a transparent substrate 11, a reflection increasing structure 12, a masking layer 13, a touch sensing structure 14, an adhesive layer 15 and a display module 16.

The transparent substrate 11 includes a non-visible area 111 and a visible area 112. The transparent substrate 11 can be a glass substrate, a plastic substrate, a sapphire substrate or a polarizing film, and the glass substrate is taken as an example, but the transparent substrate 11 is not limited thereto. The visible area 112 is a displaying area of the touch device 1. Users can see images displayed on the display module 16 through the visible area 112. The non-visible area 111 is located at the periphery of the visible area 112, namely, disposed on at least one side of the visible area 112. The masking layer 13 is disposed on the non-visible area 111 for hiding traces, one or more circuit boards, or other electronic components thus improving aesthetics. The masking layer 13 can include an ink, a photoresist or a combination thereof, such as a black ink, a black mask photoresist (BM photoresist) or a multi-layer combination of the black ink and the black mask photoresist.

The touch sensing structure 14 is disposed on the transparent substrate 11 and at least disposed at the visible area 112. In some embodiments, the touch sensing structure 14 is disposed on the visible area 112 of the transparent substrate 11, and extends to cover a part of the masking layer 13. Alternatively, in other embodiments, the touch sensing structure 14 can be disposed only on the visible area 112 of the transparent substrate 11, or designed according to product demands. A plurality of wires (not shown in the figures) are electrically connected to the touch sensing structure 14 and disposed on a part of the masking layer 13 corresponding to the non-visible area 111. The display module 16 is adhered to the transparent substrate 11 via the adhesive layer 15. The display module 16 can be a liquid crystal display module or an organic light emitting diode display module, and the display module is not limited thereto.

The reflection increasing structure 12 is disposed at the non-visible area 111 of the transparent substrate 11. The masking layer 13 corresponds to the reflection increasing structure 12, and the masking layer 13 is disposed at the non-visible area 111 of the transparent substrate 11. In some embodiments, the masking layer 13 is disposed at one side of the transparent substrate 11 toward the display module 16, and the reflection increasing structure 12 is disposed between the transparent substrate 11 and the masking layer 13. In other words, the reflection increasing structure 12 and the masking layer 13 are disposed on the same side of the transparent substrate 11. The reflection increasing structure 12 can increase the equivalent reflectivity of the non-visible area 111, such that the apparent colors of the non-visible area 111 and the visible area 112 are uniform when the monitor of the touch device 1 is turned off.

Because the refractive index and the reflectivity satisfy the following formula: $R=[(N_1-N_2)/(N_1+N_2)]^2$, wherein N1 is the equivalent refractive index of the non-visible area, N2 is the refractive index of air, R is the equivalent reflectivity of the non-visible area, when the refractive index N1 and the refractive index N2 change, the reflectivity R changes accordingly, such that by adjusting the refractive index of the reflection increasing structure 12, the equivalent reflectivity of the non-visible area 111 can be adjusted correspondingly.

In addition, the apparent colors of the non-visible area 111 and the visible area 112 are relative to the reflective indexes of their corresponding stack configurations. When the equivalent reflective index of the non-visible area 111 changes, its corresponding color coordinate also changes, namely, the apparent colors are different. In some embodiments, the stack configuration corresponding to the non-visible area 111 includes the transparent substrate 11, the reflection increasing structure 12 and the masking layer 13. Since the masking layer 13 has low light transmittance, the stack configuration below the masking layer 13 can be ignored. The stack configuration corresponding to the visible area 112 includes the transparent substrate 11, the touch sensing, structure 14, the adhesive layer 15 and the display module 16.

Figure 1B:
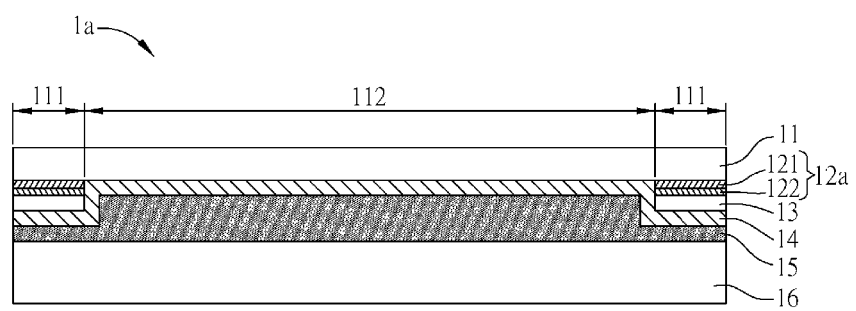
FIG. 1B is a cross-sectional view of another touch device according to the first embodiment of the disclosure.

Furthermore, the refractive index of the reflection increasing structure 12 is configured to match the whole equivalent refractive index of the stack configuration corresponding to the visible area 112. For example, when the equivalent refractive index is increased, the refractive index of the reflection increasing structure 12 should be increased, too. In the implementation, the reflection increasing structure 12 can be a single film structure (as shown in FIG. 1A), and its refractive index is between 1.5 and 1.9. Alternatively, the reflection increasing structure 12 can also be a complex structure, and the refractive indexes of the adjacent reflection increasing films are different. Taking the touch device 1a shown in FIG. 1B for example, the reflection increasing structure 12a includes a first reflection increasing film 121 and a second reflection increasing film 122. The first reflection increasing film 121 is disposed on the transparent substrate 11 and the second reflection increasing film 122 covers the first reflection increasing film 121. Herein, the refractive index of the first reflection increasing film 121 is between 1.6 and 2.5. The refractive index of the second reflection increasing, film 122 is between 1.3 and 1.5.

In addition, the material of the reflection increasing structure 12 is correspondingly adjusted in accordance with the selected refractive index. The material of the reflection increasing structure 12 can have silicon oxide ($SiO_5$), magnesium fluoride ($MgF_2$), titanium oxide ($Ti_3O_5$), niobium oxide ($Nb_2O_5$), nitrogen silicide ($SiN_x$) nitrogen oxide silicon ($SiO_xN_y$) or a combination of those. Herein, the silicon oxide ($SiO_5$) and the magnesium fluoride ($MgF_2$) are low refractive index material (the refractive index is between 1.3 and 1.5), and the titanium oxide ($Ti_3O_5$), niobium oxide ($Nb_2O_5$), nitrogen silicide (SiNx) nitrogen oxide silicon ($SiO_xN_y$) are high refractive index material (the refractive index is between 1.6 and 2.5). It is noted that when the reflection increasing structure 12 of low refractive index is utilized, the thickness of the reflection increasing structure 12 can be less than 60 mm. When the reflection increasing structure 12 of high refractive index is utilized, the thickness of the reflection increasing structure 12 can be further less than 20 mm. On the other hand, because the material of the touch sensing structure 14 is frangible, the area of the touch sensing structure 14 which located at the sidewall of the reflection increasing structure 12 easily breaks due to the difference in level when the reflection increasing structure 12 is too thick. Thus, the preferable thickness of the reflection increasing structure 12 is between 10 nm and 100 nm.

By the reflection increasing structure 12 and adjusting its refractive index, the quantity of the light beam reflected by the non-visible area 111 can be increased, such that the color difference between the non-visible area 111 and the visible area 112 becomes smaller, and their colors become similar. In some embodiments, the reflectivity difference between the non-visible area 111 and the visible area 112 is smaller than 0.5%.

In addition, according to the Lab color space, the color coordinate of the non-visible area 111 is defined as $(L_1, a_1^*, b_1^*)$, and the color coordinate of the visible area 112 is defined as $(L_2, a_2^*, b_2^*)$. The color tolerance E for the non-visible area 111 and the visible area 112 is $[(L_1-L_2)+(a_1^*-a_2^*)+(b_1^*-b_2^*)]^{\wedge}(\frac{1}{2})$. In some embodiments, the color tolerance E is smaller than 4 SDCM for ensuring that the apparent colors of non-visible area 111 and the visible 112 are similar or the same.

Figure 2A:
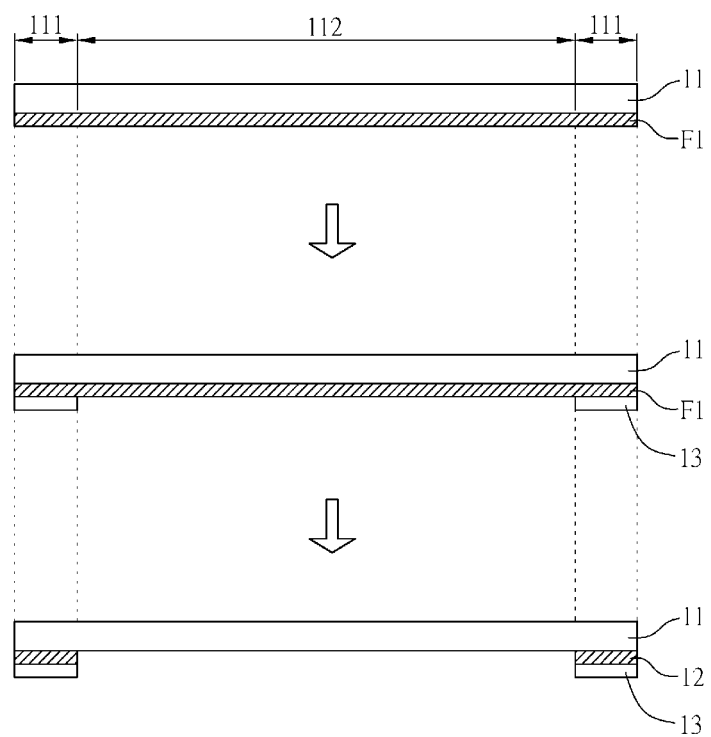
FIG. 2A is a process flow chart of the touch device according to the first embodiment of the disclosure.

As to the manufacturing process, the reflection increasing structure 12 can be formed on the transparent substrate 11 by depositing and etching. FIG. 2A is a process flow chart of the touch device according to some embodiments of the disclosure. In some embodiments, the transparent substrate 11 can be fully deposited with a reflection increasing film F1. The disposition can be, for example but not limited to, evaporation, sputtering or coating. Then, the masking layer 13 is formed on the part of the reflection increasing film F1 corresponding to the non-visible area 111. Finally, the part of the reflection increasing film F1 corresponding to the visible area 112 is etched for removing the part of reflection increasing film F1 corresponding to the visible area 112 to form the reflection increasing structure 12. The etching time is less than 10 minutes.

Figure 2B:
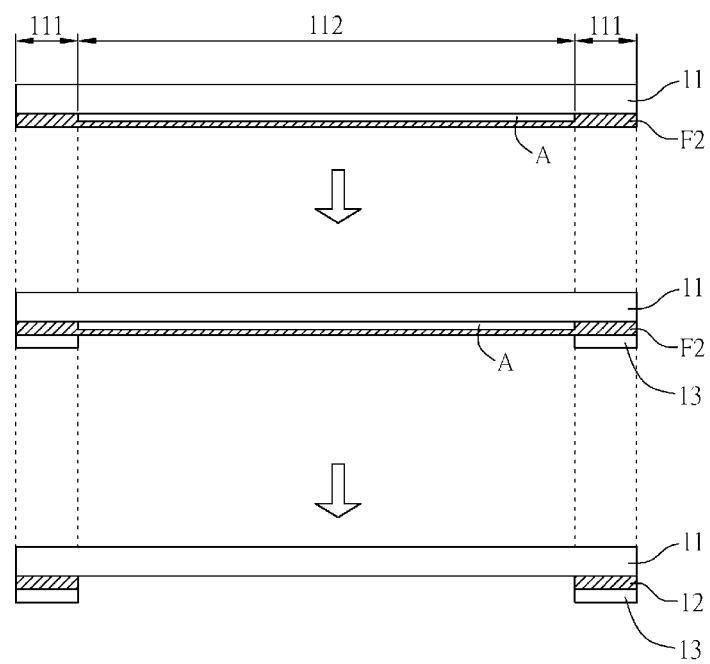
FIG. 2B is another process flow chart of the touch device according to the first embodiment of the disclosure.

FIG. 2B is another process flow chart of the touch device according to some embodiments of the present disclosure. Referring to FIG. 2B, the reflection increasing film F2 of the visible area 112 in the embodiment is removed by ripping the peelable adhesive A. Specifically, in some embodiments, a peelable adhesive A is firstly printed on the visible area 112 of the transparent substrate 11, and the reflection increasing film F2 is deposited on the peelable adhesive A and the transparent substrate 11. The deposition method similarly can be, for example but not limited to, evaporation, sputtering or coating. Then, the masking layer 13 is formed on the part of the reflection increasing film F2 corresponding to the non-visible area 111. Finally, the peelable adhesive A is ripped to remove a part of the reflection increasing film F2 of the visible area 112 to form the reflection increasing structure 12.

Figure 3:
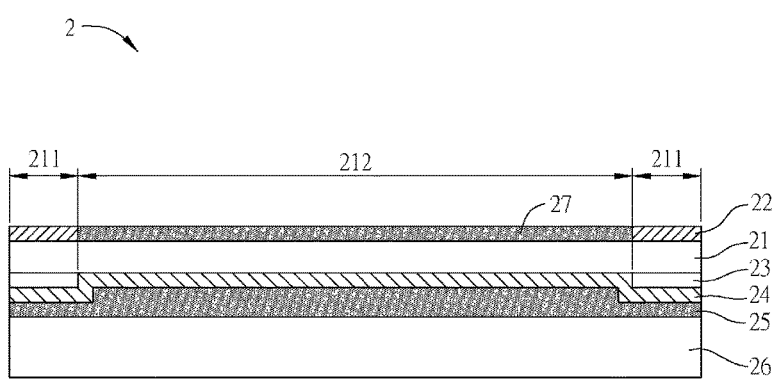
FIG. 3 is a cross-sectional view of a touch device according to a second embodiment of the disclosure.

FIG. 3 is a cross-sectional view of a touch device according to the other some embodiments of the disclosure. Referring to FIG. 3, a touch device 2 includes a transparent substrate 21, a reflection increasing structure 22, a masking layer 23, a touch sensing structure 24, a adhesive layer 25 and a display module 26. In the embodiment, the reflection increasing structure 22 and the masking layer 23 are respectively disposed on the different sides of the transparent substrate 21.

Further, the masking layer 23 is disposed on one side of the transparent substrate 21 towards the display module 26 and the reflection increasing structure 22 is disposed on one side of the transparent substrate 21 away from the display module 26. The masking layer 23 and the reflection increasing structure 22 are both disposed on the non-visible area 211 of the transparent substrate 21. Herein, the reflection increasing structure 22 similarly can utilize the refractive index to change the whole reflectivity of the non-visible area, such that the apparent color of the non-visible area can be the same with that of the visible area. In addition, the descriptions of the reflection increasing structure 22 can refer to that in above embodiments, and thus they are not repeated again.

In addition, because the reflection increasing structure 22 in the embodiment is not disposed on the side of the transparent substrate 21 towards the display module, the risk that the touch sensing structure 24 breaks at the difference in level of the non-visible area 211 can be reduced.

It is noted that the reflection increasing structure 22 in some embodiments is disposed on the surface pressed by user. Because the visible area 212 does not have the reflection increasing structure 22, the junction between the visible area 212 and the non-visible area 211 has the difference in level and it is not a planar surface. In order to avoid bad user experience due to the feeling of the difference in level when the user presses or touches, the touch device 2 in the embodiment further includes a planar layer 27. It is disposed on the same side of the transparent substrate 21 which the reflection increasing structure 22 is disposed on, and located on the visible area 212 of the transparent substrate 21.

In some embodiments, the surface of the planar layer 27 away from the transparent substrate 21 and the surface of the reflection increasing structure 22 away from the transparent substrate 21 are substantially co-planar. Namely, the thickness of the planar layer 27 can be roughly the same as that of the reflection increasing structure 22 for reducing the difference in level mentioned above. In addition, as to the manufacturing process, the planar layer 27 may be slightly thicker or thinner than the reflection increasing structure 22 due to tolerance. Nevertheless, above effect for reducing the difference in level can still be achieved.

In addition, the material of the planar layer 27 can be the same as the material of the transparent substrate 21, namely, their refractive indexes are the same. Therefore, the touch device 2 will not accordingly change the whole refractive index of the visible area 212 due to the disposal of the planar layer 27. For example, when the transparent substrate 21 is a glass substrate, the material of the planar layer 27 can includes silica such that the refractive index of the planar layer 27 can be the same as that of the glass substrate.

In summary, the touch device of the disclosure utilizes the reflection increasing structure disposed on the non-visible area of the transparent substrate to increase the equivalent reflectivity of the non-visible area, such that the apparent colors of the non-visible area and the visible area are uniform when the monitor of the touch device is turned off.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated, that the appended claims will cover all modifications that fall within the true scope of the disclosure.

What is claimed is:

1. A touch device, comprising:
    a transparent substrate, having a non-visible area and a visible area, wherein the non-visible area is disposed around a periphery of the visible area;
    a first stack configuration disposed on the non-visible area of the transparent substrate, wherein the first stack configuration comprises a reflection increasing structure, wherein the reflection increasing structure is only disposed on the non-visible area of the transparent substrate and is configured to increase an equivalent reflective index of the first stack configuration;
a masking layer disposed on the non-visible area of the transparent substrate, wherein the reflection increasing structure is disposed between the masking layer and the transparent substrate; and
a second stack configuration disposed on the visible area of the transparent substrate, wherein:
the second stack configuration comprises a touch sensing structure, an adhesive layer and a display module,
a reflectivity difference between the equivalent reflective index of the first stack configuration and an equivalent reflective index of the second stack configuration is smaller than 0.5%,
a color coordinate of the non-visible area is defined as $(L_1, a_1^*, b_1^*)$ and a color coordinate of the visible area is defined as $(L_2, a_2^*, b_2^*)$, where:
$L_1$ is a lightness of the non-visible area,
$L_2$ is a lightness of the visible area,
$a_1^*$ is a green-red color component of the non-visible area,
$a_2^*$ is a green-red color component of the visible area,
$b_1^*$ is a blue-yellow color component of the non-visible area, and
$b_3^*$ is a blue-yellow color component of the visible area, and
a color tolerance (E) for the non-visible area and the visible area is $[(L_1-L_2)+(a_1^*-a_2^*)+(b_1^*-b_2^*)]^{(1/2)}$.

2. The touch device of claim 1, wherein the reflection increasing structure is directly disposed on a first surface of the transparent substrate.

3. The touch device of claim 1, wherein:
the reflection increasing structure is a single film structure, and
a refractive index of the reflection increasing structure is between 1.5 and 1.9.

4. The touch device of claim 1, wherein:
the reflection increasing structure comprises at least two reflection increasing films, and
a refractive indexes of two adjacent reflection increasing films of the at least two reflection increasing films are different.

5. The touch device of the claim 1, wherein:
the reflection increasing structure comprises a first reflection increasing film and a second reflection increasing film,
the first reflection increasing film is disposed on the transparent substrate,
the second reflection increasing film is disposed on the first reflection increasing film,
a refractive index of the first reflection increasing film is between 1.6 and 2.5, and
a refractive index of the second reflection increasing film is between 1.3 and 1.5.

6. The touch device of claim 1, wherein a material of the reflection increasing structure comprises silicon oxide ($SiO_5$), magnesium fluoride ($MgF_2$), titanium oxide ($Ti_3O_5$), niobium oxide ($Nb_2O_5$), nitrogen silicide ($SiN_x$), nitrogen oxide silicon ($SiO_xN_y$) or a combination thereof.

7. The touch device of claim 1, wherein a thickness of the reflection increasing structure is between 10 nm and 100 nm.

8. The touch device of claim 1, wherein the transparent substrate is a glass substrate, a plastic substrate, a sapphire substrate or a polarization film.

9. The touch device of claim 1, wherein the masking layer comprises an ink, a photoresist or a combination thereof.

10. The touch device of claim 1, wherein the color tolerance E for the visible area and the non-visible area is less than 4 Standard Deviation Color Matching (SDCM).

11. The touch device of claim 2, wherein:
a first part of the touch sensing structure is directly disposed on the first surface of the transparent substrate and disposed on the visible area,
a second part of the touch sensing structure is disposed on a sidewall of the reflection increasing structure and on a sidewall of the masking layer, and
a third part of the touch sensing structure is disposed on a surface of the masking layer.

12. The touch device of claim 11, wherein the adhesive layer is disposed between the display module and the touch sensing structure.

13. The touch device of claim 12, wherein the adhesive layer comprises a first part disposed on the first part of the touch sensing structure and a second part disposed on the third part of the touch sensing structure.

14. The touch device of claim 1, wherein:
a reflective index of the reflection increasing structure is between 1.3 and 1.5 and a thickness of the reflection increasing structure is less than 60 nm, or
the reflective index of the reflection increasing structure is between 1.6 and 2.5 and the thickness of the reflection increasing structure is less than 20 nm.

15. A touch device, comprising:
a transparent substrate, having a non-visible area and a visible area, wherein the non-visible area is disposed around a periphery of the visible area;
a reflection increasing structure only disposed above the non-visible area of the transparent substrate;
a masking layer only disposed below the non-visible area of the transparent substrate;
a touch sensing structure disposed below the transparent substrate; and
a display module disposed below the touch sensing structure, wherein:
a color coordinate of the non-visible area is defined as $(L_1, a_1^*, b_1^*)$ and a color coordinate of the visible area is defined as $(L_2, a_2^*, b_2^*)$, where:
$L_1$ is a lightness of the non-visible area,
$L_2$ is a lightness of the visible area,
$a_1^*$ is a green-red color component of the non-visible area,
$a_2^*$ is a green-red color component of the visible area,
$b_1^*$ is a blue-yellow color component of the non-visible area, and
$b_2^*$ is a blue-yellow color component of the visible area, and
a color tolerance E for the non-visible area and the visible area is $[(L_1-L_2)+(a_1^*-a_2^*)+(b_1^*-b_2^*)]^{(1/2)}$.

16. The touch device of claim 15, comprising a planar layer disposed above the transparent substrate, wherein a top surface of the planar layer is substantially co-planar with a top surface of the reflection increasing structure.

17. The touch device of claim 16, wherein the planar layer directly contacts the transparent substrate to define an interface between the planar layer and the transparent substrate.

18. The touch device of claim 15, wherein:
the reflection increasing structure directly contacts the transparent substrate,
the masking layer directly contacts the transparent substrate, and the touch sensing structure directly contacts the transparent substrate, a sidewall of the masking layer, and a bottom surface of the masking layer.

19. The touch device of claim 18, comprising an adhesive layer disposed between the touch sensing structure and the display module, wherein the adhesive layer is in direct contact with a sidewall of the touch sensing structure and a top surface of the display module.

20. A touch device, comprising:
- a transparent substrate, having a non-visible area and a visible area, wherein the non-visible area is disposed around a periphery of the visible area;
- a reflection increasing structure only disposed below the non-visible area of the transparent substrate;
- a masking layer only disposed below the reflection increasing structure;
- a touch sensing structure disposed below the transparent substrate and below the masking layer, wherein the touch sensing structure is in direct contact with a sidewall of the reflection increasing structure, a sidewall of the masking layer, and a bottom surface of the masking layer; and
- a display module disposed below the touch sensing structure, wherein:
  - a color coordinate of the non-visible area is defined as $(L_1, a_1^*, b_1^*)$ and a color coordinate of the visible area is defined as $(L_2, a_2^*, b_2^*)$, where:
    - $L_1$ is a lightness of the non-visible area,
    - $L_2$ is a lightness of the visible area,
    - $a_1^*$ is a green-red color component of the non-visible area,
    - $a_2^*$ is a green-red color component of the visible area,
    - $b_1^*$ is a blue-yellow color component of the non-visible area, and
    - $b_2^*$ is a blue-yellow color component of the visible area, and
  - a color tolerance (E) for the non-visible area and the visible area is $[(L_1-L_2)+(a_1^*-a_2^*)+(b_1^*-b_2)]^{(1/2)}$.

* * * * *